(12) United States Patent
Hedlund et al.

(10) Patent No.: US 9,163,763 B2
(45) Date of Patent: Oct. 20, 2015

(54) ARRANGEMENT, VENTILATION ARM, VENTILATION SYSTEM

(75) Inventors: Lars Hedlund, Skellefteå (SE); Lars Karlander, Skellefteå (SE)

(73) Assignee: FUMEX AB, Skelleftea (SE)

( * ) Notice: Subject to any disclaimer, the term of this patent is extended or adjusted under 35 U.S.C. 154(b) by 1044 days.

(21) Appl. No.: 12/863,522

(22) PCT Filed: Jan. 14, 2009

(86) PCT No.: PCT/SE2009/050023
§ 371 (c)(1),
(2), (4) Date: Jul. 19, 2010

(87) PCT Pub. No.: WO2009/091328
PCT Pub. Date: Jul. 23, 2009

(65) Prior Publication Data
US 2010/0297924 A1    Nov. 25, 2010

(30) Foreign Application Priority Data
Jan. 18, 2008  (SE) ...................................... 0800128

(51) Int. Cl.
| | |
|---|---|
| B08B 15/04 | (2006.01) |
| F16L 27/12 | (2006.01) |
| B08B 15/00 | (2006.01) |
| F16L 27/08 | (2006.01) |

(52) U.S. Cl.
CPC ............... *F16L 27/125* (2013.01); *B08B 15/00* (2013.01); *B08B 15/04* (2013.01); *F16L 27/0857* (2013.01); *F16L 27/0861* (2013.01)

(58) Field of Classification Search
None
See application file for complete search history.

(56) References Cited

U.S. PATENT DOCUMENTS

| | | | | | |
|---|---|---|---|---|---|
| 2,320,813 | A | * | 6/1943 | Cowles | .......................... 285/116 |
| 2,427,260 | A | * | 9/1947 | Cowles | ........................ 285/334.5 |

(Continued)

FOREIGN PATENT DOCUMENTS

EP        1 380 247 A2        1/2004

OTHER PUBLICATIONS

International Search Report for corresponding application No. PCT/SE2009/050023 mailed Apr. 7, 2009.

*Primary Examiner* — Gregory Huson
*Assistant Examiner* — Eric Gorman
(74) *Attorney, Agent, or Firm* — Renner, Otto, Boisselle & Sklar, LLP

(57) ABSTRACT

This invention concerns an arrangement (3) that is comprised as a component (4.2) of an airtransport channel where the air-transport channel component (4.2) comprises two tubular sub-elements, a first sub-element (7) and a second sub-element (8), where the second element (8) has a diameter that is somewhat larger than that of the first element (7), which allows the first element (7) to be inserted into the second element (8) such that the two elements (7, 8) can be displaced relative to each other in a telescopic manner. The arrangement (3) is characterised in that it comprises a glide sleeve (11) that is arranged between the first element (7) and the second element (8), that the glide sleeve (11) comprises a first part (12) that retains the glide sleeve (11) at the second element (8), that the glide sleeve (11) comprises a second part (13) that makes contact with the first element (7) under a force (F) that can be adjusted and that is united with the first part (12), and that all parts of the second part (13) are located in front of the first end (8.1) of the second element. The invention concerns also a ventilation arm (2) and a ventilation system (1).

19 Claims, 5 Drawing Sheets

(56) References Cited

U.S. PATENT DOCUMENTS

| | | | |
|---|---|---|---|
| 4,056,273 A * | 11/1977 | Cassel | 285/337 |
| 4,124,233 A * | 11/1978 | Ahlstone | 285/18 |
| 4,489,472 A * | 12/1984 | Cabrit et al. | 29/426.5 |
| 4,541,327 A * | 9/1985 | Lundstrom | 454/63 |
| 4,993,756 A * | 2/1991 | Bechu | 285/319 |
| 5,211,602 A * | 5/1993 | Holmgren | 454/63 |
| 5,336,130 A * | 8/1994 | Ray | 454/65 |
| 5,516,159 A * | 5/1996 | Hirakawa et al. | 285/388 |
| 5,536,206 A * | 7/1996 | Bodmer et al. | 454/65 |
| 5,635,675 A * | 6/1997 | Houga | 174/68.3 |
| 5,738,148 A * | 4/1998 | Coral et al. | 138/120 |
| 5,791,980 A * | 8/1998 | Kramer, Jr. | 454/64 |
| 5,882,048 A * | 3/1999 | Kawasaki et al. | 285/319 |
| 6,764,394 B2 * | 7/2004 | Sharifi et al. | 454/64 |
| 7,273,413 B2 * | 9/2007 | Frink | 454/63 |
| 7,922,212 B2 * | 4/2011 | Werth | 285/243 |
| 7,922,213 B2 * | 4/2011 | Werth | 285/243 |
| 7,954,779 B2 * | 6/2011 | Coral et al. | 248/280.11 |
| 2002/0047264 A1 * | 4/2002 | Kim | 285/7 |
| 2004/0055758 A1 * | 3/2004 | Brezinski et al. | 166/384 |
| 2004/0082293 A1 * | 4/2004 | Sharifi et al. | 454/64 |
| 2004/0094955 A1 * | 5/2004 | Bettinger | 285/302 |
| 2004/0227345 A1 * | 11/2004 | Okamoto et al. | 285/331 |
| 2006/0175837 A1 * | 8/2006 | Ignaczak et al. | 285/420 |
| 2006/0284415 A1 * | 12/2006 | McKay | 285/256 |
| 2007/0108760 A1 * | 5/2007 | McKay | 285/256 |
| 2007/0257488 A1 * | 11/2007 | Jimenez | 285/404 |
| 2008/0106092 A1 * | 5/2008 | Klein et al. | 285/5 |
| 2008/0224079 A1 * | 9/2008 | Maruyama et al. | 251/152 |
| 2009/0032757 A1 * | 2/2009 | Maruyama et al. | 251/150 |
| 2012/0200082 A1 * | 8/2012 | Liang | 285/371 |
| 2013/0207385 A1 * | 8/2013 | Williams et al. | 285/307 |

* cited by examiner

ARRANGEMENT, VENTILATION ARM, VENTILATION SYSTEM

This application is a national phase of International Application No. PCT/SE2009/050023 filed Jan. 14, 2009 and published in the English language.

This invention concerns an arrangement that makes it possible to improve the precision of the placement of an opening of an air transport channel into or away from a source of contamination or a region that it is desired should be held ventilated and free of contaminants.

Ventilation systems of various types are used to ventilate various spaces and to transport away undesired airborne particles, gases, substances, contaminants and other material that may be present in the air at various types of work environment. One example is the type of ventilation system that is used in laboratories, during assembly work, or during other types of work. A simple description of such a ventilation system is that it comprises an air-extraction arrangement and an air-transport arrangement. The air-transport arrangement normally comprises an air-transport channel with an air-extraction unit at one end of the channel and an opening, normally comprising an extraction mouthpiece, at the second end of the channel. The extraction mouthpiece is arranged at the source of the contaminant or at a region that it is desired should be held free of contaminants, and the air-extraction unit creates a negative pressure at the opening such that the existing air and any undesired gases or substances, or both gases and substances, are drawn into the air-transport channel.

Such a ventilation system often comprises a ventilation arm that constitutes a part of the air-transport channel, that part that is located closest to the source of contamination or the region that is to be held free of contaminants. The ventilation arm in turn comprises components that are connected to each other in such a manner that they can be bent, and their positions relative to each other can be adjusted, such that the extraction mouthpiece arranged at the outermost free end of the ventilation arm can be placed in the region of interest, where the contaminant is present or where it is not desired. The rear part of the ventilation arm is connected to the air-transport channel, through which the air is transported away.

In order for it to be possible to move the arm and lock it into a position, the arm comprises various forms of arrangement that can be activated and deactivated and that influence, guide, regulate and lock the motion of the ventilation arm. One problem of having several components that are connected to form an arm construction that is to be moved is that the precision of the placement of the extraction mouthpiece is not very precise. Precise movement of the arm towards or away from the region of interest is difficult when several sub-elements and joints are to be influenced and when the constituent arm components have at least two degrees of freedom of movement at each joint construction.

One purpose of this invention is to offer an arrangement that makes it possible to improve the precision of the placement of an opening of an air transport channel into or away from a source of contamination or a region that it is desired should be held ventilated and free of contaminants.

An aspect of the present invention provides a ventilation arm component comprising a first element, a second element, the second element having a diameter larger than that of the first element so that the first element can be inserted into the second element and the two elements can be displaced relative to each other in a telescopic manner, a glide sleeve that is arranged between the first element and the second element, the glide sleeve including a first part that retains the glide sleeve at the second element, the glide sleeve including a second part that makes contact with the first element under a force that can be adjusted and that is united with the first part, and wherein the second part is located in front o1 a first end of the second element, a circumferentially continuous circular part that lies in contact with the glide sleeve and is arranged for the transfer of the force against the second part of the glide sleeve that is held in contact with the first element, and a tensionerfor increasing or decreasing the circumference of the circumferentially continuous circular part by circumferentially de-tensioning or tensioning the circumferentially continuous circular part, respectively, wherein the tensioner is located in a compartment in the glide sleeve, and the glide sleeve has at least one opening that allows access to the tensioner from outside the glide sleeve bv an adjustment tool that can be inserted through the at least one opening for adjusting the tensioner to increase or decrease the circumference of the circumferentially continuous circular part and then removed after the tensioner has been adiusted.

The invention will be described in the description below with reference to FIG. 1 to FIG. 6. Parts and items are labelled in the drawings with reference numbers. Parts and items that correspond to each other or that are identical in different drawings and for different embodiments have been given the same reference numbers.

Figure 1:
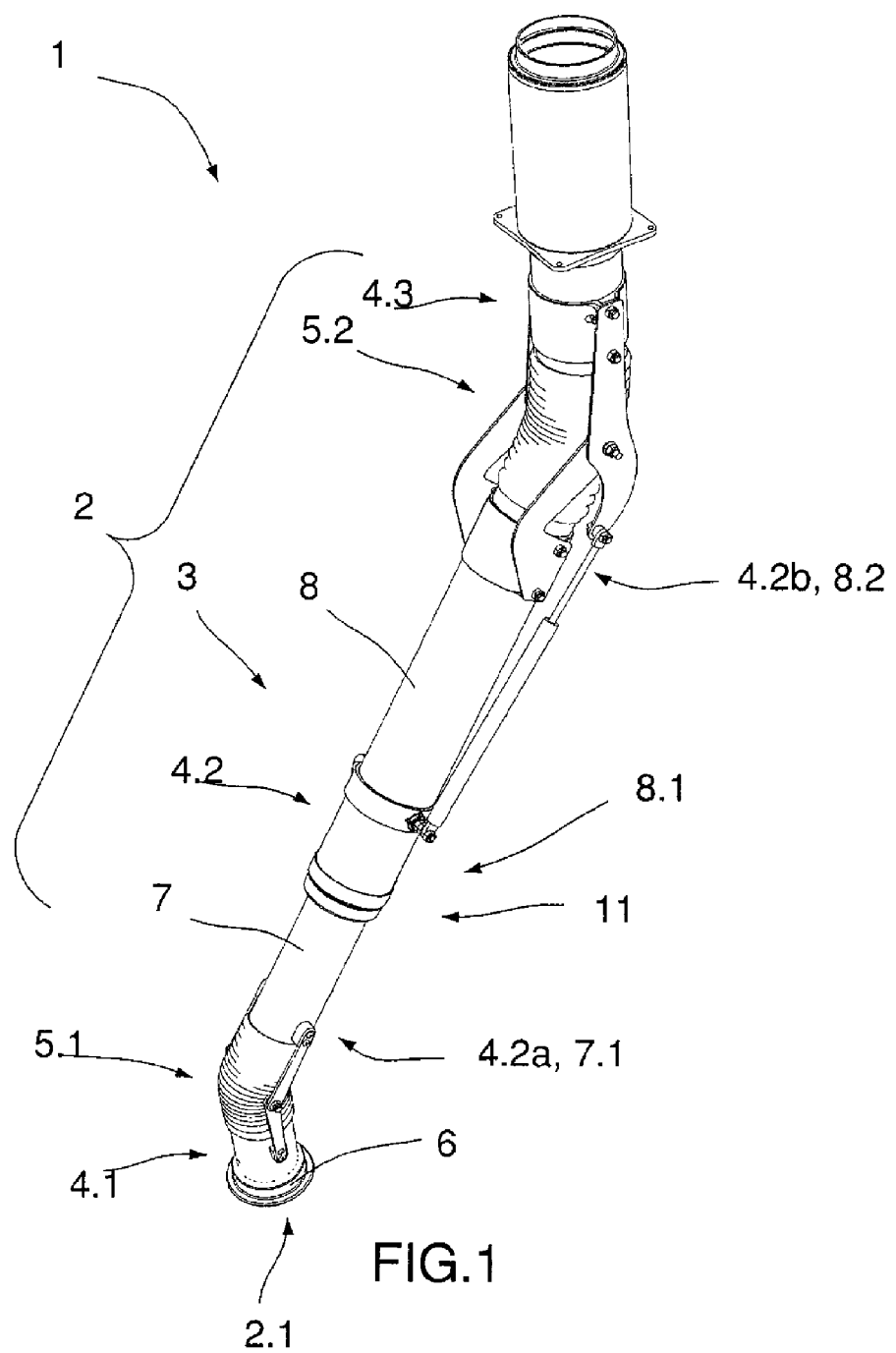
FIG. 1 shows parts of an air-transport arrangement, a ventilation system, according to the invention.

FIG. 1 shows parts of a ventilation system 1, a ventilation system, comprising a ventilation arm 2 and therein comprised parts of an air-transport channel. The ventilation arm 2 comprises an arrangement 3 according to the invention that makes it possible to improve the precision of displacement of the ventilation arm 2, to improve the precision of the placement of an opening of the air transport channel into or away from a source of contamination or a region that it is desired should be held ventilated and free of contaminants. The ventilation system 1 and, in particular, the ventilation arm 2 comprises components 4.1-4.3 that are connected to, and can be rotated relative to, each other and other parts of the ventilation system 1, such as an outlet channel, through a first and a second joint construction, 5.1 and 5.2, respectively. The ventilation system 1, the ventilation system, also comprises an air-extraction arrangement, which is not shown in the drawings.

The open free end 2.1 of the ventilation arm normally comprises some type of extraction mouthpiece 6 that is located at, in the vicinity of, a source of air contamination, not shown in the drawings, or a region that it is desired should be held ventilated and free of contaminants. The joint constructions 5.1 and 5.2 ensure that it is possible to pivot and guide the arm more easily.

Figure 2:
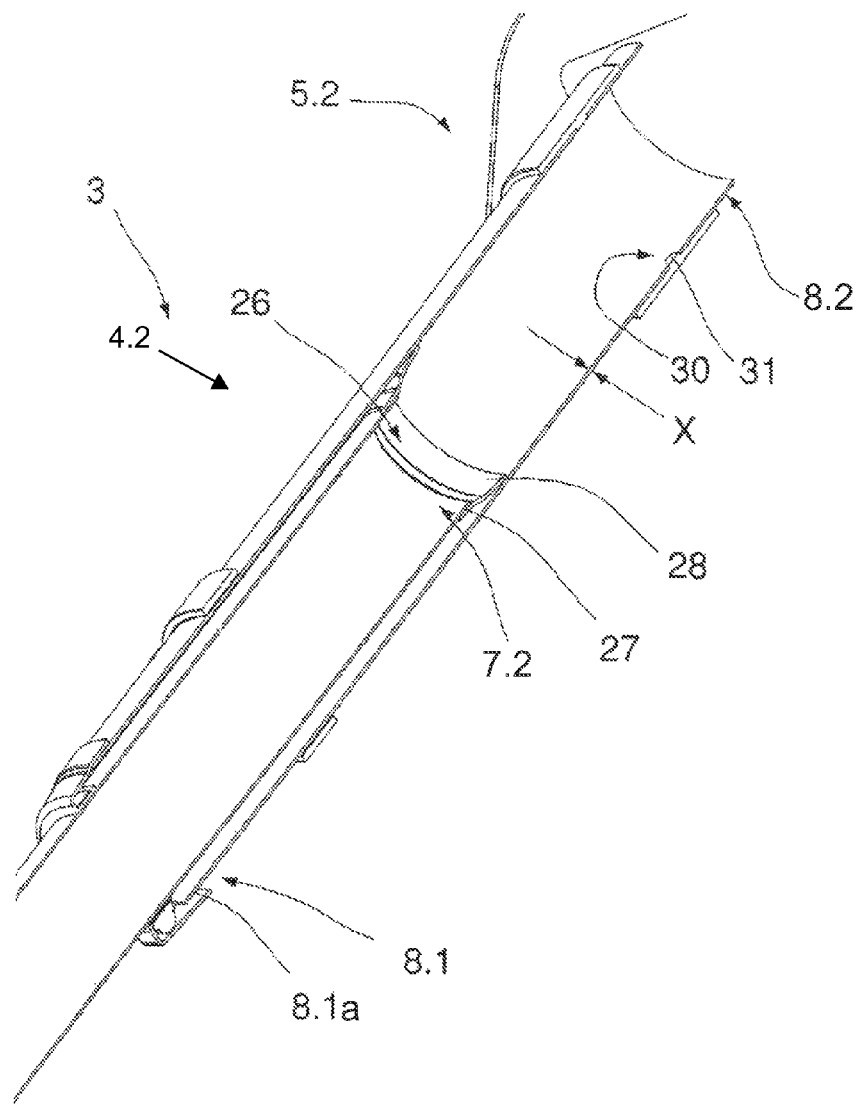
FIG. 2 shows an arrangement according to the invention.

The arrangement 3 according to the invention comprises the ventilation arm 2, as shown in FIGS. 1 and 2. The arrangement 3 is comprised as part of the ventilation arm component 4.2. This component 4.2 comprises in turn two elements, a first element 7 and a second element 8. Each element 7 or 8 is a tubular element where the second tube element 8 has a somewhat larger diameter than the first tube element 7 which allows the first element 7 to be inserted into the second element 8 such that the two elements 7 and 8 can be displaced relative to each other in a telescopic manner.

Figure 3:
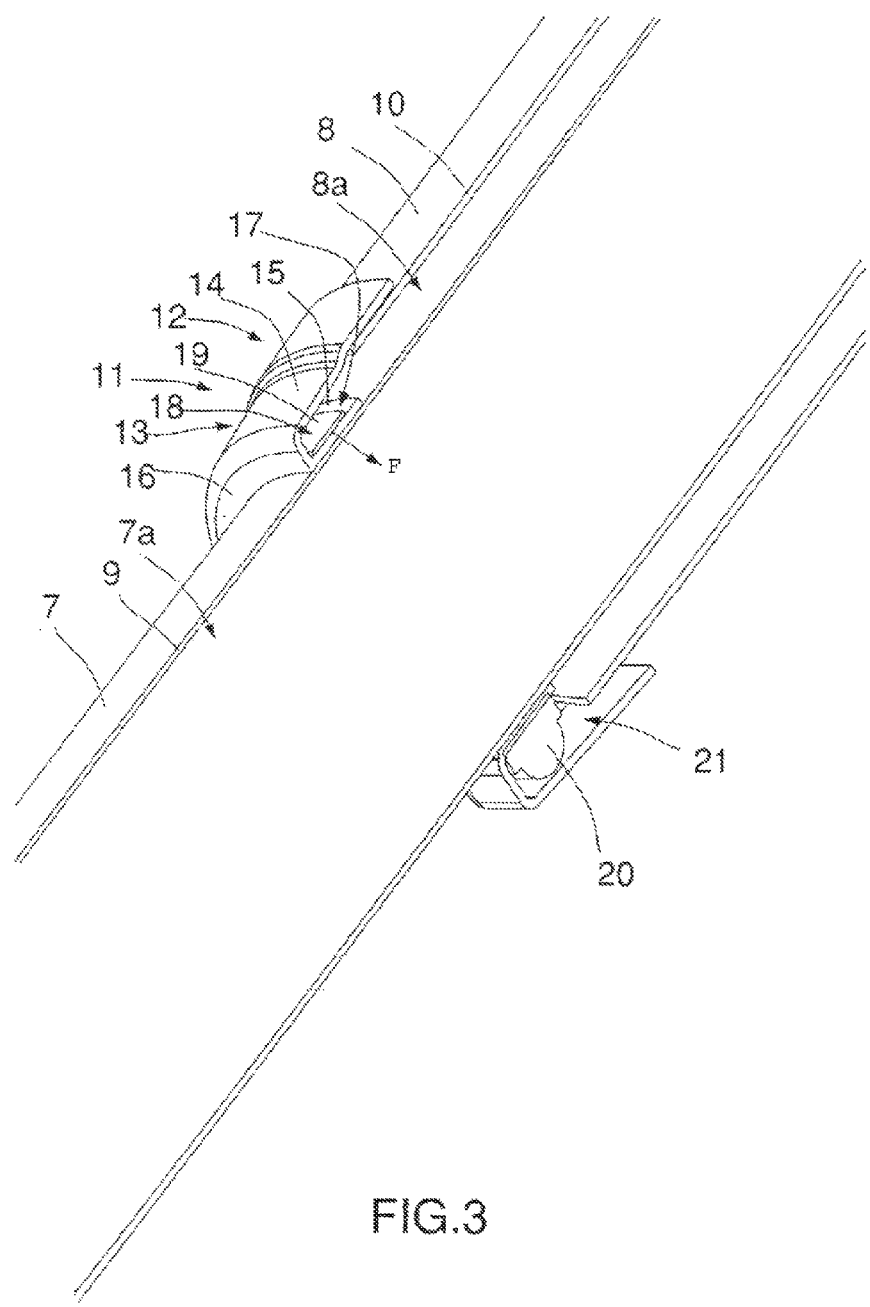
FIG. 3 shows a glide sleeve that is comprises as part of an arrangement according to the invention.

Each tubular element 7 and 8 comprises a wall element 9 and 10, respectively, as 20 shown in FIG. 3. These wall elements form the limits of hollow centers 7a and 8a, respectively, and they comprise a first and a second open end 7.1 and 7.2/8.1 and 8.2, see FIGS. 1 and 2. The relevant first end 7.1/8.1 is directed towards the open free end 2.1 of the ventilation arm, which is located at the source of contamination or in the region that it is desired should be held ventilated and free of contaminants.

Each tubular element 7 and 8 is manufactured from a rigid substance, or from several interacting rigid substances, or in a manner that results in rigidity.

Figure 4:
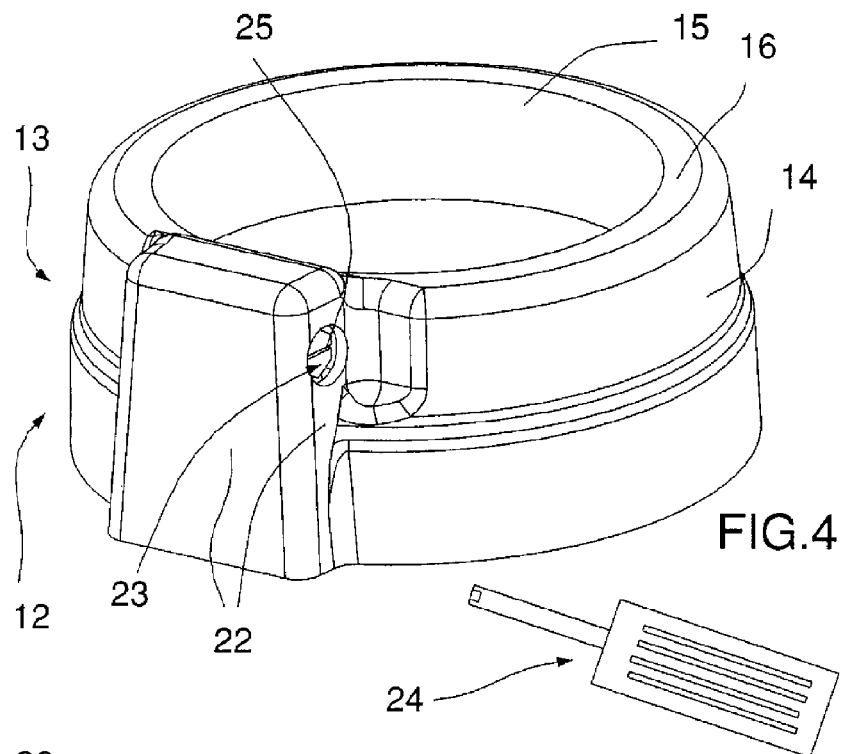
FIG. 4 shows a separate glide sleeve.

A glide sleeve 11 is arranged between the first and the second elements 7 and 8 that centres the two elements 7 and 8 relative to each other and that makes it possible to displace the inner, first, element 7 relative to the outer, second, element 8. The glide sleeve 11 is principally arranged and attached to the first end 8.1 of the second element, see FIGS. 2-4.

The glide sleeve 11 comprises a first part 12, a circular flange, that retains the glide sleeve 11 at the second element 8. The first part 12 is united with the second element 8 and it is arranged on the outer surface 8.1a of the first end 8.1 of the second element. The first part 12 may also be united with the second element 8 in another manner that provides a corresponding connection between the first part 12 and the second element 8.

The glide sleeve 11 furthermore comprises a second part 13 that is in contact with the first element 7 under a force F that can be adjusted. This second part 13 is united with the first part 12 and it is located such that all parts are located in front of the first end 8.1 of the second element.

The second part 13 comprises a first part 14 that unites the second part 13 with the first part 12, and a second part 15 that is in contact with the first element 7. The first part 14 and the second part 15 are circular and centrically arranged relative to each other, the second part 15 being arranged within the first part 14 and with the first element 7 being centred within the second part 13. The first part 14 and the second part 15 are coupled to each other by a connector 16 that maintains a separation between the first part 14 and the second part 15 such that a hollow compartment 17 arises between the first part 14 and the second part 15.

An arrangement 18 for the transfer of force is arranged in the glide sleeve 11 in order to transfer a force F that increases friction against the second part 13, against the second part 15, of the glide sleeve 11 that is held in contact with the first element 7.

The arrangement 18 for transferring force comprises a circular part 19, a band, that follows the circular form of the glide sleeve and that interacts with a tension arrangement 20. The tension arrangement 20 can be adjusted such that it is possible to increase or decrease the circumference of the circular part, the band, whereby it is possible to increase or decrease the force F that presses the glide sleeve 11 against the first element 7. The circular part 19, the band, makes contact with the glide sleeve 11 around the complete circumference of the glide sleeve such that the force F is distributed evenly around the complete glide sleeve 11 and the first element 7, such that the application of force is distributed and becomes essentially the same around the complete construction.

The circular part 19, the band, is arranged in the compartment 17 in the glide sleeve 11. The tension arrangement 20 is also arranged in the compartment 17. The glide sleeve 11 demonstrates in the compartment 17 a larger space 21, with sufficient place for the tension arrangement 20. The location of the tension arrangement 20 in this space 21 determines the position of the tension arrangement 20 relative to the glide sleeve 11 since the space 21 demonstrates limiting wall elements 22 that surround the tension arrangement.

The glide sleeve 11 is provided with at least one opening 23 that allows access to at least one of the circular part 19 and the tension arrangement 20 arranged in the glide sleeve 11. The opening 23 is located in that part of the glide sleeve 11 at which the larger space 21 is located such that it is possible to access the tension arrangement 20 located in the larger space 21 from outside using a tool 24 through the opening 23.

The glide sleeve 11 is manufactured from one or several plastic materials that have good glide properties, flexible and lubricating properties, for the surface that is to glide against one of the elements 7 and 8, and that have retaining properties in those regions that are to retain the glide sleeve and the glide control. Different types of polyurefins, such as polyethene (PE) and polypropene (PP), work well, while other materials that have the desired properties may also be used.

The tension arrangement 20 and the force F are adjusted through a part of the tension arrangement 20 that comprises an action part 25 that is activated and subsequently initiates a change in position of at least one end of the circular part 19 and thus leads to an increase or decrease in the circumference of the circular part, of the band, and its force against or around the first element 7. The activation of the action part 25 takes place with the aid of the tool 24. The action part 25 may be, for example, a screw or a bolt, and the tool 24 may be, for example, a screwdriver or key.

Figure 5:
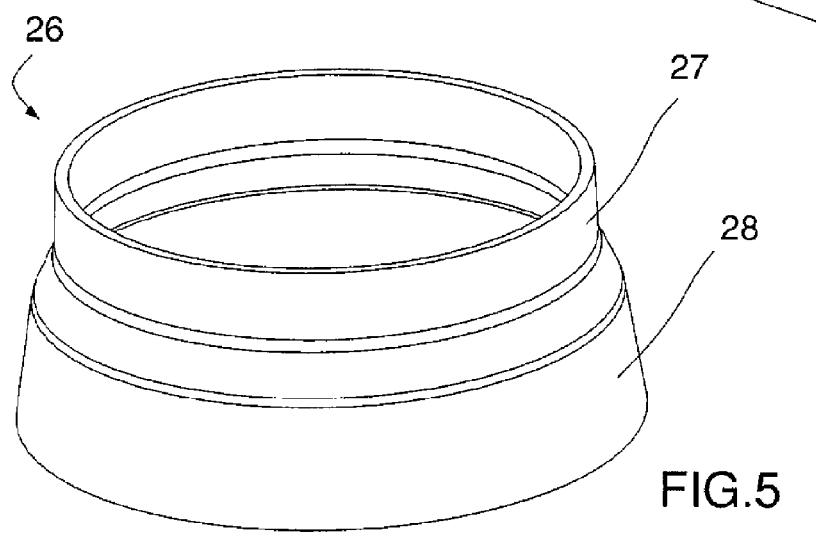
FIG. 5 shows a separate glide control.

A glide control 26 is also arranged between the first element 7 and the second element 8, as shown in FIGS. 2 and 5. The glide control 26 is arranged at, and it is integrated with, the second end 7.2 of the first element 7, the end that is principally arranged within the second element 8.

The glide control 26 comprises a flange 27 arranged at the outer surface of the first element and that couples the glide control 26 with the first element 7. The glide control 26 comprises further a continuation 28 that constitutes an extension of the flange 27 a further distance backwards and which protrudes a certain distance outside of the first element 7, making contact with the inner surface of the second element. The glide control 26 has the form of a cone with its most narrow region, the region having the lowest diameter, in the region that comprises the flange 27 and that attaches the glide control 26 to the first element 7. This shape results in flexibility in the design of the glide control and the arrangement, which in turn prevents the elements 7 and 8 becoming locked relative to each other in such a manner that displacement of the first element 7 relative to the second element 8 becomes impossible.

The glide control 26 is manufactured from one or several plastic materials that have good glide properties, flexible and lubricating properties, for the surface that is to glide against one of the elements 7 and 8, and that have retaining properties in those regions that are to retain the glide sleeve and the glide control. Different types of polyurefins, such as polyethene (PE) and polypropene (PP), work well, while other materials that have the desired properties may also be used.

The tubular elements 7 and 8 may be circular when seen in cross-section, or they may be oval, edged, or have another shape that provides suitable flow of air through them and that allows a telescopic movement of the two elements 7 and 8 relative to each other.

The ventilation arm component 4.2 comprising the two elements 7 and 8 comprises a first and a second end 4.2a, 7.1, and 4.2b, 8.2, directed towards and united with components 4.1 and 4.3 that are neighbours, through the previously mentioned joint constructions 5.1 and 5.2, as shown in FIGS. 1, 2 and 6. The second end 8.2 of the second element is united with the second joint construction 5.2. The joint construction 5.2 comprises a construction 29 that has the form of a clamped joint and that is fixed clamped around the second element 8, on its outer surface.

In order to stabilise the attachment of the joint construction 5.2 to the second element 8, the second element 8 comprises an opening 30 into which a part 31 of the joint construction 5.2 can be inserted. The stabilisation opening 30 may penetrate the material, the wall element 10, of the second element fully or partially. The component 31 of the joint construction has such a length that it remains within and is surrounded by the second element 8. The component 31 of the joint construction has a length or height that is less than the thickness X of the wall element. This means that the first element 7 can move freely within the second element 8, even past the region at which the joint construction 5.2 is attached to the second element 8.

The interaction between the opening and the part of the joint construction is such that they remain in rigid relationship with each other and the only movement that is possible is during assembly, when the component 31 of the joint construction is inserted into the stabilisation opening 30. Once the assembly has been carried out, the joint construction 5.2 and the second element 8 are locked relative to each other for all degrees of freedom.

It is appropriate that the length of the first element 7 be chosen such that the glide control 26 is arranged at the rear part of the second element 8 when the first element 7 has been introduced to its maximal extent into the second element 8. This means that the full lengths of the two elements can be used during telescopic displacement of the two elements relative to each other, in order to achieve maximal length of the arrangement 3.

Figure 6:
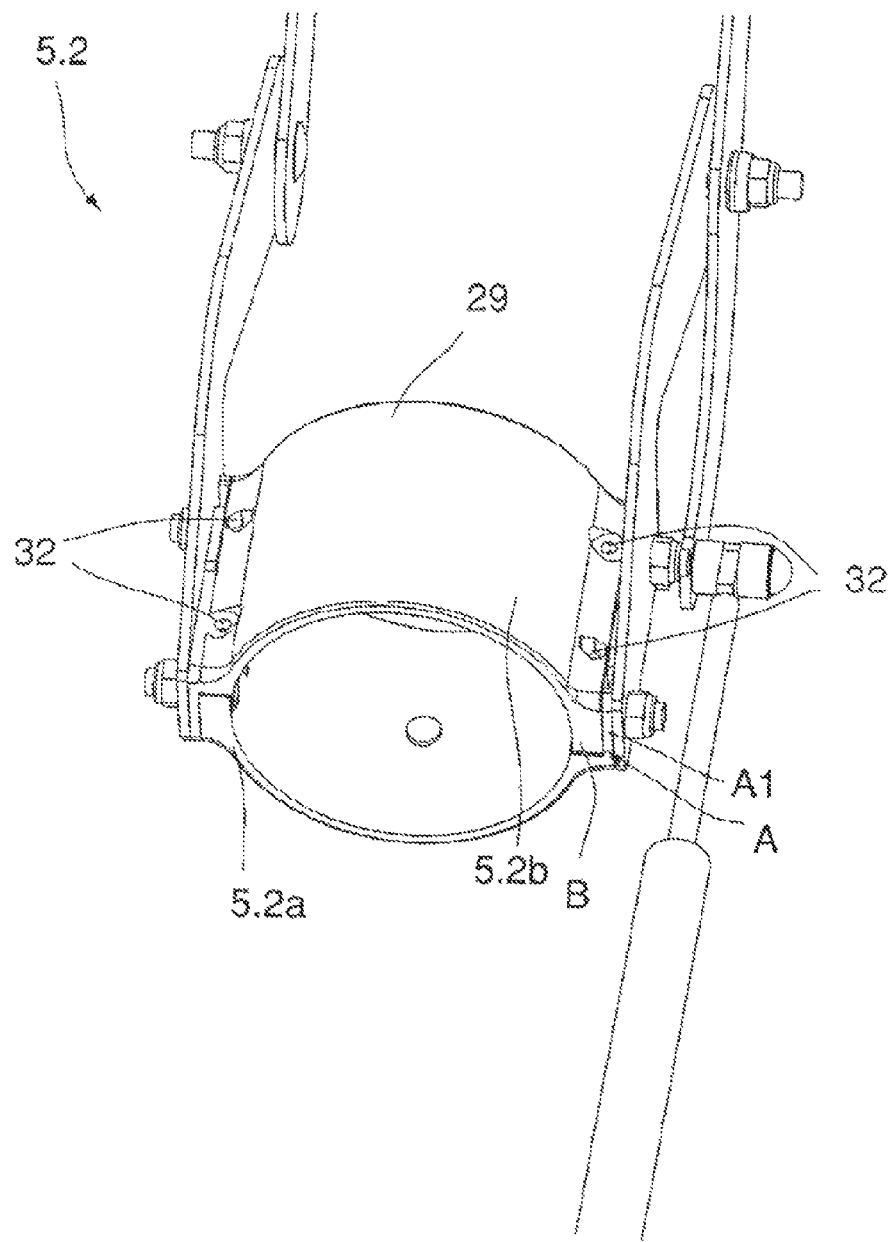
FIG. 6 shows a joint construction and a joint construction component.

The second joint construction 5.2, the construction 29 having the form of a clamp, comprises two identical joint halves 5.2a and 5.2b, that are assembled together with the aid of attachment means 32 that join the two joint halves 5.2a and 5.2b to each other and that are placed in tension around the second element 8 on its outer surface, as shown in FIG. 6. The joint halves 5.2a and 5.2b are identical, but they comprise a first and a second side part, A and B respectively, with different appearances. The joint halves 5.2a and 5.2b are assembled together with the first and the second side parts A and B that have different appearances assembled together, each on one side of the second element 8. The first side part A of one joint half has a flange A1 that makes contact at its side that is directed in towards the element with the second side part B of the second joint half, against an outer surface, a plane surface, of the side part B.

This description of different embodiments of the invention and alternative designs of its items is not to be seen as a limitation of the invention: it is to be interpreted in its broadest meaning in order not to limit unnecessarily the protective scope according to the attached patent claims. Changes that lie within the expertise of a person skilled in the arts lie within the protective scope of the innovative concept. The various designs of items that are given in the description above can be used and combined freely, as long as the desired function is obtained.

The invention claimed is:

1. A ventilation arm component comprising
    a first element,
    a second element, the second element having a diameter larger than that of the first element so that the first element can be inserted into the second element and the two elements can be displaced relative to each other in a telescopic manner,
    a glide sleeve that is arranged between the first element and the second element, the glide sleeve including a first part that retains the glide sleeve at the second element, the glide sleeve including a second part that makes contact with the first element under a force that can be adjusted and that is united with the first part, and wherein the second part is located in front of a first end of the second element,
    a circumferentially continuous circular part that lies in contact with the glide sleeve and is arranged for the transfer of the force against the second part of the glide sleeve that is held in contact with the first element, and
    a tensioner for increasing or decreasing the circumference of the circumferentially continuous circular part by circumferentially de-tensioning or tensioning the circumferentially continuous circular part, respectively, wherein the tensioner is located in a compartment in the glide sleeve, and the glide sleeve has at least one opening that allows access to the tensioner from outside the glide sleeve by an adjustment tool that can be inserted through the at least one opening for adjusting the tensioner to increase or decrease the circumference of the circumferentially continuous circular part and then removed after the tensioner has been adjusted.

2. The ventilation arm component according to claim 1, wherein the first part is arranged at the first end of the second element.

3. The ventilation arm component according to claim 1, wherein the circumferentially continuous circular part is arranged in a hollow compartment in the glide sleeve.

4. The ventilation arm component according to claim 1, wherein the circumferentially continuous circular part is arranged in the compartment.

5. The ventilation arm component according to claim 3, wherein the second part of the glide sleeve comprises a first subpart that unites the second part with the first part and a second subpart that makes contact with the first element, and wherein the first subpart and the second subpart are connected to each other by a connector that also ensures that the first subpart and the second subpart lie at a certain separation from each other such that the compartment is formed between the first subpart and the second subpart.

6. The ventilation arm component according to claim 1, comprising a glide control arranged between the first and the second elements and arranged at, and integrated with, a second end of the first element, which second end is principally arranged within the second element.

7. The ventilation arm component according to claim 6, wherein the glide control comprises a flange arranged at the outer surface of the first element and that unites the glide control with the first element.

8. The ventilation arm component according to claim 7, wherein the glide control comprises a continuation that constitutes an extension of the flange and that protrudes a certain distance outside of the first element, making contact with the inner surface of the second element.

9. The ventilation arm component according to claim 7, wherein the glide control has the form of a cone with its most narrow region, the region having the smallest diameter, in the region that comprises the flange.

10. The ventilation arm component according to claim 1, wherein the elements when viewed in cross-section are circular, oval or edged shape, or another shape that provides suitable flow of air through them while still enabling telescopic movement of the two elements relative to each other.

11. The ventilation arm component according to claim 1, wherein the two elements form part of a component that is directed towards and connected with a neighboring component through a joint construction comprising a joint construction part that can be introduced into a stabilization opening in a wall of the second element and where the joint construction part has a length in the stabilization opening that is shorter than a thickness of the wall adjacent the stabilization opening.

12. A ventilation arm comprising components that are connected to each other, and that can be pivoted relative to each other, through a first and a second joint construction joined together by the ventilation arm component according to claim 1.

13. The ventilation arm according to claim 12, wherein the second joint construction comprises two identical joint halves that are assembled together against the second element.

14. The ventilation arm according to claim 13, wherein the joint halves are identical, but where each joint half comprises a first and a second side part with different appearances.

15. The ventilation arm according to claim 14, wherein the first side part of one joint half has a flange that makes contact with the second side part of the second joint half.

16. A ventilation system comprising the ventilation arm according to claim 12.

17. A ventilation arm component comprising
a first element,
a second element, the second element having a diameter larger than that of the first element so that the first element can be inserted into the second element and the two elements can be displaced relative to each other in a telescopic manner,
a glide sleeve that is arranged between the first element and the second element, the glide sleeve including a first part that retains the glide sleeve at the second element, the glide sleeve including a second part that makes contact with the first element under a force that can be adjusted and that is united with the first part, and wherein the second part is located in front of a first end of the second element,
a circumferentially continuous circular part that lies in contact with the glide sleeve and is arranged for the transfer of the force against the second part of the glide sleeve that is held in contact with the first element, and
a tensioner for increasing or decreasing the circumference of the circumferentially continuous circular part, wherein the tensioner is located in a compartment in the glide sleeve, and the glide sleeve has at least one opening that allows access to the tensioner from outside the glide sleeve by an adjustment tool that can be inserted through the at least one opening for adjusting the tensioner to increase or decrease the circumference of the circumferentially continuous circular part and then removed after the tensioner has been adjusted.

18. The ventilation arm component according to claim 17, wherein the first part is arranged at the first end of the second element.

19. The ventilation arm component according to claim 17, wherein the circumferentially continuous circular part is arranged in a hollow compartment in the glide sleeve.

* * * * *